Our invention relates to sander and polisher attachments for reciprocating power saws, and more particularly to such attachments applied to the portable reciprocating power saws commonly known as sabre saws.

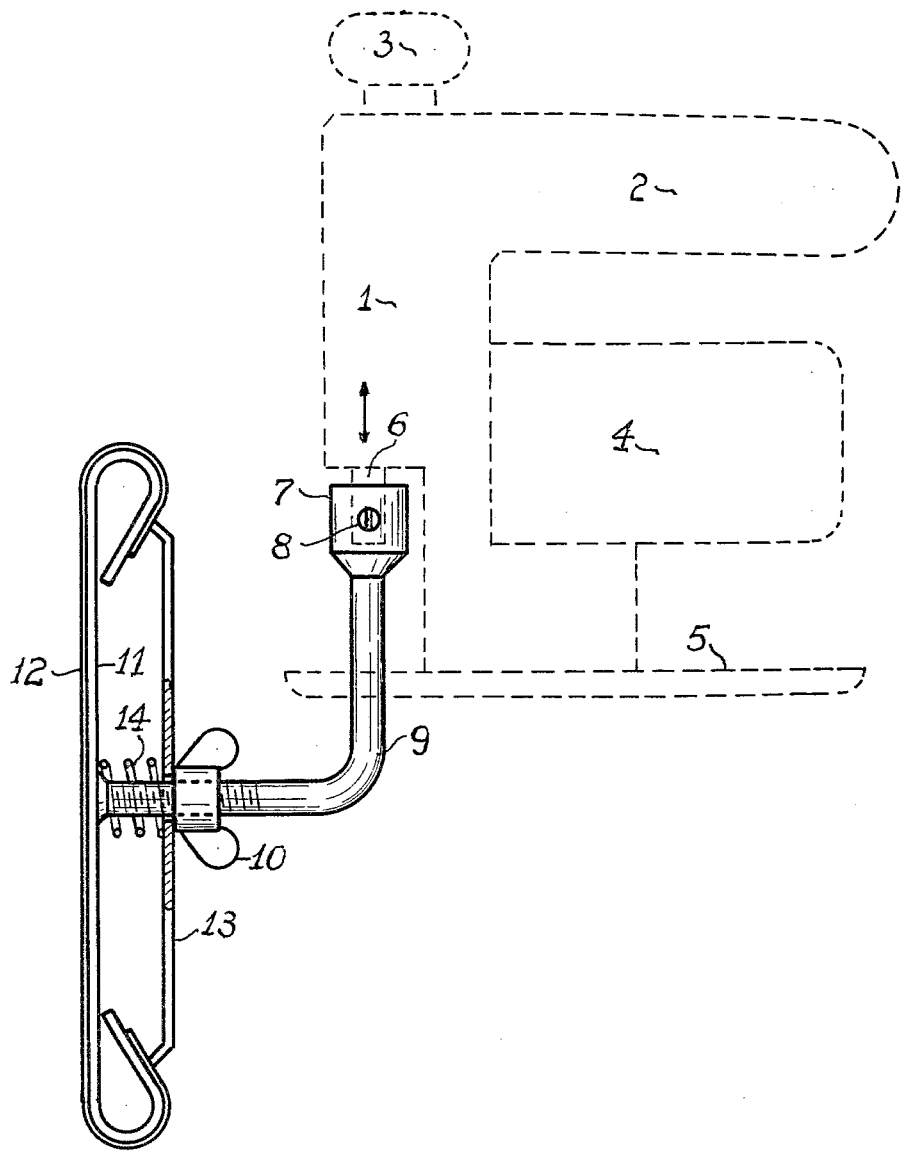
Leonardo Sargolini
Anthony Berardi
INVENTORS 3,229,428
SANDER AND POLISHER ATTACHMENT FOR
RECIPROCATING POWER SAWS
Leonardo C. Sargolini, 22 Bagley Ave., and Anthony L.
Berardi, 186 Circular Ave., both of Hamden, Conn.
Filed Jan. 7, 1964, Ser. No. 336,260
4 Claims. (Cl. 51—241)

Sabre saws are very widely used in various industries and also by home craftsmen; the principal object of the present invention is to increase the utility of these sabre saws by providing an easily applicable and inexpensive attachment whereby the sabre saws can be utilized very efficiently as sanders and polishers.

Another important object of the present invention is to provide an attachment which, when applied to a sabre saw, will show exceptional efficiency as a sander or polisher due to the much longer stroke of the sabre saws as compared with the customary portable electric sanders and polishers.

A further object of the present invention is to provide an attachment which, when applied to a sabre saw, will serve as a very practical sander and polisher in automobile body work because of the substantially vertical movement of the sanding or polishing element and the ample power available in the average sabre saw.

Other objects and advantages of our invention will be apparent during the course of the following description.

In the accompanying drawing, forming a part of the present application, for the purpose of illustration there is shown a partially sectional side view of the preferred form of our sander and polisher attachment as applied to a sabre saw.

Referring to the drawing, the numeral 1 designates a sabre saw which is of the usual construction, being provided with a handle 2 and a knob 3 for holding the tool by both hands for a steady support. The numeral 4 designates the driving motor, which is usually electric, and 5 represents the base plate of the saw.

An important element of the sabre saw is the reciprocating shaft or ram 6, which is usually of circular cross section and is provided with a hole near its lower end which is normally used for attaching the saw blade holding chuck to the end of reciprocating shaft 6 when the tool is used as a saw. In order to use the tool as a sander or polisher the saw blade holding chuck and the saw blade must be removed, therefore, they are not shown in the drawing.

Our novel sander and polisher attachment is composed of the following elements:

Secured to the free end of the reciprocating shaft 6, by means of a socket 7 and set screw 8, is an L-shaped member 9, one leg of which is co-axial with the reciprocating shaft 6 and passes through a hole in the base plate 5, originally provided for admitting the saw blade through the base plate 5. The other leg of the L-shaped member 9 has a threaded part provided with a wing nut 10.

Secured to the one end of L-shaped member 9 is a work plate 11 which in the preferred form illustrated has a flat frontal surface with the upper and lower ends being folded over so as to form an angle with respect to the frontal surface of the work plate. The ends of the work plate, as illustrated, are folded about an angle greater than 180 degrees and further provide planar surfaces angled inwardly towards the plane of the work plate 11.

In alternative forms of our invention the work plate 11 may vary in shape, for instance, the frontal surface of the work plate may be concave or convex cylindrical in order to suit the particular sanding or polishing operation performed with the tool.

Mounted on work plate 11 is the sanding or polishing means 12 which may consist of various types of abrasive sheets or polishing cloth known in the art depending on the type of sanding or polishing work required and the nature of the material worked on.

Interposed between the work plate 11 and the wing nut 10 is a clamping plate 13 which is slidably mounted on the threaded portion of the L-shaped member 9.

As an optional element, a coil spring 14 is provided for pressing the clamping plate 13 against the wing nut 10.

The clamping means employed for securing a section of surface working material, such as a sanding or polishing element 12 to the work plate 11, illustrated in the drawing, is an important feature of the present invention. The clamping plate 13 is so formed that when advanced by the wing nut 10 the upper and lower horizontal edges of the clamping plate 13 will engage the corresponding ends of the sanding or polishing element 12 resting on the folded over ends of the work plate 11. The tightening of the wing nut 10 will produce a strong pressure between the upper and lower edges of the clamping plate 13 and the adjacent ends of the sanding or polishing element 12. As the back surface of the sanding or polishing element 12 is much smoother than the working surface in contact with the edges of the clamping plate 13, the result of this strong pressure will be a forward sliding of the upper and lower ends of the sanding or polishing element 12 on the adjacent folded over inclined ends of the work plate 11 until the sanding or polishing element 12 is perfectly tight. The further tightening of the wing nut 10 will secure the sanding or polishing element effectively in this tight position. Thus, the clamping means of our sander and polisher attachment has two functions: the tightening and the securing of the sanding or polishing element 12.

The operation of our invention is as follows: In the application of our attachment the first step is the removal of the saw blade holding chuck and the saw blade from the end of the reciprocating shaft 6. Following this, the L-shaped member 9 is secured to the end of the reciprocating shaft 6 by means of the socket 7 and the set screw 8. Then, the sanding or polishing element 12 is mounted on the work plate 11 and tightened and secured by means of the wing nut 10. The tool now is ready for operation.

During the sanding or polishing operation one hand of the operator holds the handle 2 and the other hand the knob 3, giving a very steady support, and the reciprocating motion of the shaft 6 will impart a similar motion to the connected attachment. In view of the ample power and the long stroke of the customary sabre saw its effectiveness as a sander or polisher will be exceptionally high.

It is to be understood that the form of our invention herein shown and described is only an example of the same, and that various modifications in the shape, size and in the arrangement of parts may be resorted to, without departing from the spirit of our invention or the scope of the subjoined claims.

We claim:
1. An attachment for use with a sabre saw motor drive having a reciprocating shaft, comprising an L-shaped member having substantially perpendicularly disposed legs, one of said legs having socket means at the end thereof for attaching said member to the reciprocating shaft, said other leg being threaded and carrying a nut thereon, a work plate having ends folded over at an angle of greater than 180 degrees, said work plate being attached to the end of said other leg, a clamping plate, said clamping plate being received on said other leg between said nut and said work plate and being slidable on said other leg, said clamping plate being so formed that its edges are engageable with the folded ends of said work plate, said work plate being adapted to have a section of sanding material mounted thereon and extend over said folded ends so that the section may be engaged and secured to said work plate by advancing said nut on said other leg to cause said clamping plate to tightly engage the section of sanding material between the clamping plate and said folded ends and tension said section of sanding material along the length of said work plate.

2. An attachment for use with a sabre saw motor drive having a reciprocating shaft and arranged to hold a section of a surface working material, comprising an L-shaped member having substantially perpendicularly disposed legs, one of said legs having means at the end thereof for attachment to the reciprocating shaft, a work plate, said work plate having ends folded over at angles greater than 180 degrees and inclined toward the work engaging surface, said work plate being attached to the end of said other leg, a clamping plate, said clamping plate being received on said other leg and being slidable thereon, said clamping plate being so formed that its edges are engageable with the folded ends of said work plate, means on said other leg for tightening said clamping plate against said work plate, so that as said clamping plate is tightened the ends of clamping plate first engage and tighten a section of surface working material on said work plate and then secure the surface working material as said tightening means is further tightened.

3. An attachment for use with a device having a reciprocating shaft, comprising an L-shaped member having substantially perpendicularly disposed legs, one of said legs having means at the end thereof for attachment to the reciprocating shaft, a work plate, said work plate being attached to the end of said other leg, said work plate having a planar base portion and opposite end portions thereof folded over about angles greater than 180 degrees and providing clamping surfaces inclined towards said base portion, a clamping plate, said clamping plate being received on said other leg and being slidable thereon, said clamping plate having a central portion with end portions inclined toward said clamping surfaces, and means on said other leg for urging said clamping plate towards said work plate and the end portions of said clamping plate into engagement with said clamping surfaces and maintaining said end portions in such engagement.

4. An attachment for use with a device having a reciprocating shaft, comprising an L-shaped member having substantially perpendicularly disposed legs, one of said legs having means at the end thereof for attachment to the reciprocating shaft, a work plate, said work plate being attached to the end of said other leg, said work plate having a planar base portion and opposite end portions thereof folded over about angles greater than 180 degrees and providing clamping surfaces inclined towards said base portion, a clamping plate, said clamping plate being received on said other leg and being slidable thereon, said clamping plate having a central portion with end portions inclined toward said clamping surfaces, a helical spring disposed about said other leg between said work plate and said clamping plate, and means on said other leg for urging said clamping plate towards said work plate and the end portions of said clamping plate into engagement with said clamping surfaces and maintaining said end portions in such engagement.

References Cited by the Examiner

UNITED STATES PATENTS

| | | | |
|---|---|---|---|
| 840,982 | 1/1907 | Williams | 51—383 X |
| 1,183,444 | 5/1916 | Fisk | 51—383 |
| 1,501,192 | 7/1924 | Severns | 51—383 |
| 2,482,344 | 9/1949 | Kent | 51—383 |
| 2,526,976 | 10/1950 | Smith. | |
| 2,575,117 | 11/1951 | Naken | 51—187 |
| 2,760,217 | 8/1956 | McKenzie | 51—187 X |
| 2,905,213 | 9/1959 | Levine | 51—170.3 X |
| 2,975,448 | 3/1961 | Glaser | 15—22 |
| 3,050,093 | 8/1962 | Jepson | 143—72 X |

ROBERT C. RIORDON, *Primary Examiner.*

LESTER M. SWINGLE, *Examiner.*